Patented Aug. 9, 1927.

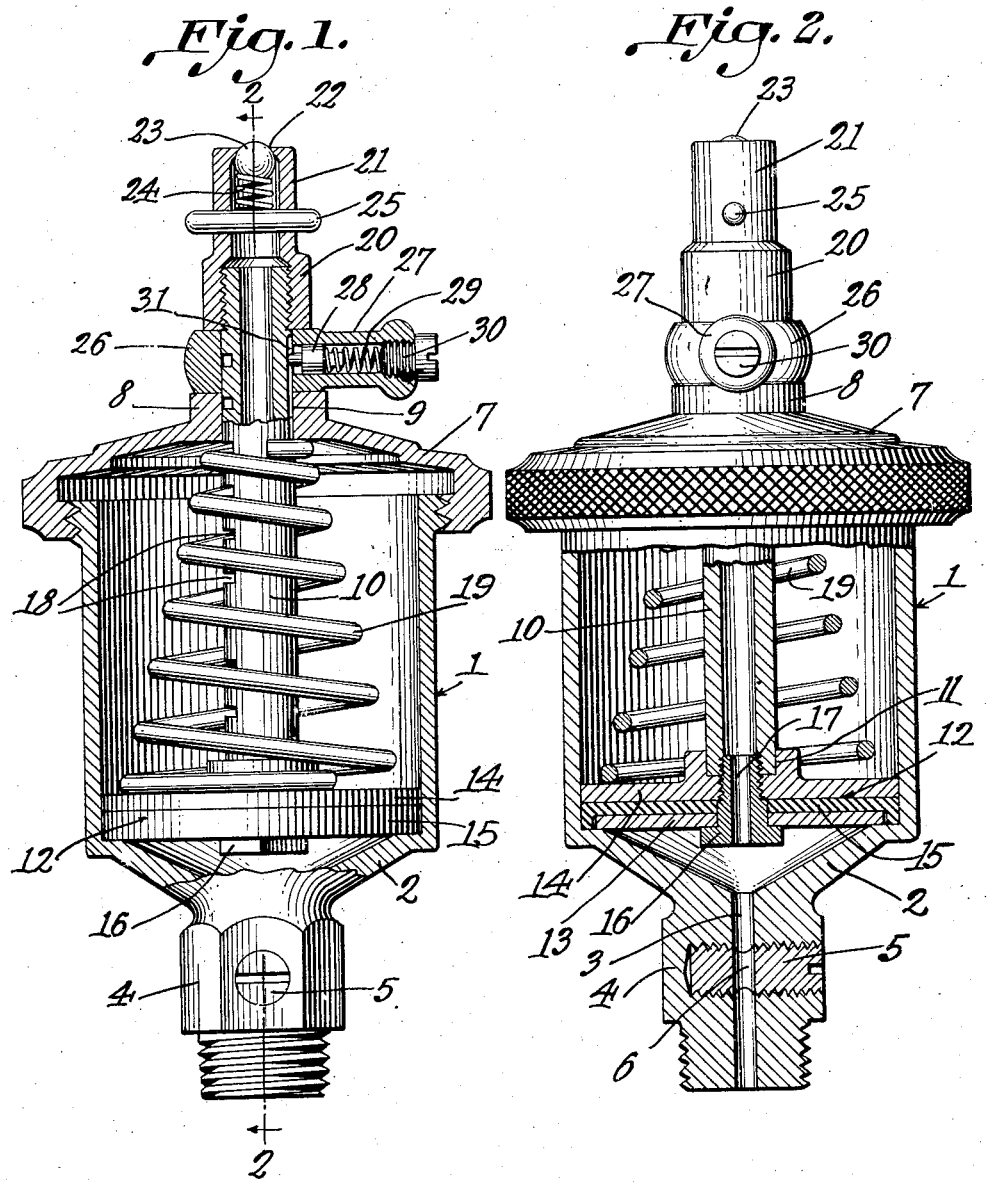

1,638,377

UNITED STATES PATENT OFFICE.

JOE JEWEL THORP, OF BRECKWALKER, TEXAS.

GREASE CUP.

Application filed January 18, 1926. Serial No. 82,100.

This invention relates to a grease cup, one of the objects of the invention being to provide a simple and efficient device of this character which can be filled readily by means of a grease gun, means being provided whereby the delivery of grease from the cup can be controlled readily.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a view partly in elevation and partly in section through the grease cup.

Figure 2 is a section on line 2—2 Figure 1, the upper portion of the grease cup being shown in elevation.

Referring to the figures by characters of reference 1 designates a grease cup having its bottom 2 tapered downwardly to an outlet opening 3 formed within a nipple 4 which extends from the bottom and is adapted to be screwed into a structure designed to support the cup. A screw valve 5 extends partly across the nipple and has an opening 6 therein adapted to be brought into alinement with the opening 3. By rotating this valve, however, the flow of grease through the opening 3 can be controlled minutely.

The top of the cup 1 is adapted to be closed by a screw cap 7 and extending from this cap is a boss 8 having an opening 9 in which is slidably and rotatably mounted a tubular stem 10. The lower end of this stem is seated within a recess 11 formed in the top of a piston 12. This piston is made up of spaced disks 13 and 14 having a leather disk 15 or the like interposed therebetween. The several disks are held assembled by means of a tubular screw 16 which extends through the disk and engages the end portion of stem 10. Thus the screw serves to hold the stem to the piston and also serves to hold the parts of the piston assembled with each other and with the stem. At the same time the opening 17 in the screw affords an outlet for grease when forced into the cup from a grease gun as hereinafter explained.

Notches 18 are provided in the outer surface of the stem 10 at desired intervals and that portion of the stem within the cup 1 is surrounded by a spring 19. One end of this spring bears against the piston while the other end bears against the cap 7.

The upper end of the tubular stem 10 is engaged by a collar 20 having a tubular stem 21 into which the stem opens. The extension 21 has an opening 22 at its outer end normally closed by a ball valve 23 which is held to its seat by a spring 24, this spring being supported by a pin 25 extending transversely through the extension 21. Thus the valve is normally closed.

A ring 26 is mounted on that portion of the stem 10 between the collar 20 and the boss 8 and this ring has a tubular arm 27 radiating therefrom. A key 28 is slidably mounted in the inner end portion of the arm 27 and is engaged by one end of a coiled spring 29 the other end of which bears against a screw plug 30 in the outer end portion of the arm 27. This spring serves to hold the key normally seated within a longitudinal groove 31 formed in the stem 10 whereby the stem is held against rotation.

When it is desired to fill the cup 1 the collar 20 is grasped and pulled away from the cup 1 so as to cause the piston 12 to compress the spring 19. During this movement the grooved portion of the stem will slide relative to the key 28. Thereafter the key can be withdrawn from the groove 21 and the stem rotated so as to cause the key 28 to become seated within one of the notches 18. This will result in holding the piston out of normal position with the spring 19 under compression. While the piston is thus held a grease gun is placed at the opening 22 in the extension 21 and grease is forced therefrom into the extension. This will unseat the valve 23 and the grease will travel longitudinally of the stem 10 and through opening 17 into the cup 1. After the cup has been filled with the grease and the grease gun has been removed the valve 23 will automatically seat. The ring 26 can then be rotated to remove the key 28 from the notch 18 whereupon spring 19 will be released and will cause the piston 12 to press firmly against the grease in the cup. The valve 5 will control the escape of the grease as heretofore explained.

By adjusting the screw plug 30 the compression of the spring 29 can be regulated.

Under normal conditions the key extends into groove 31 so that the piston cannot rotate within the cup as it travels longitudinally thereof.

What is claimed is:

The combination with a grease cup having a valved outlet, and a cap detachably engaging the cup, of a tubular stem slidably and rotatably mounted within the cap, said stem having a longitudinal groove and superposed notches in its outer surface, the notches and groove being spaced, a piston mounted to slide within the cup having a recess for one end of the stem, there being an aperture in the piston opening into the stem, a tubular member extending through the piston and into the stem for holding the piston and stem assembled and providing a passage between the stem and the bottom portion of the cup, a coiled spring mounted on the stem and constantly bearing against the piston and the cap, a collar secured to the outer end of the stem and having an inlet, a check valve normally closing the inlet, said collar constituting means for shifting the stem longitudinally against the action of the spring, a ring upon the stem between the collar and cap, and a spring pressed key movable radially within the ring and normally seated within the groove to hold the stem against rotation, said key being movable into any one of the notches to hold the stem against sliding movement in either direction, the ring being rotatable on the stem to bring the key into position to be seated either in the groove or in one of the notches.

In testimony that I claim the foregoing as my own, I have hereto affixed my signature.

JOE JEWEL THORP.